United States Patent
Strother

[11] 3,898,050
[45] Aug. 5, 1975

[54] REGENERATION APPARATUS WITH INTERNAL REGENERATED-CATALYST RECYCLE MEANS

[75] Inventor: Charles W. Strother, Arlington Heights, Ill.

[73] Assignee: Universal Oil Products Company, Des Plaines, Ill.

[22] Filed: Dec. 28, 1973

[21] Appl. No.: 429,457

[52] U.S. Cl............. 23/288 B; 23/288 S; 208/164; 252/417
[51] Int. Cl......... B01j 9/16; B01j 9/20; B01j 11/68
[58] Field of Search .......... 23/288 B, 288 S, 288 E; 252/417; 208/164

[56] References Cited
UNITED STATES PATENTS

| | | | |
|---|---|---|---|
| 2,394,710 | 2/1946 | McAfee | 252/417 |
| 2,418,003 | 3/1947 | Angell | 23/288 S UX |
| 2,929,774 | 3/1960 | Smith | 23/288 S X |
| 3,208,831 | 9/1965 | Belden | 23/288 S X |
| 3,677,715 | 7/1972 | Morrison et al. | 23/288 S |

*Primary Examiner*—Joseph Scovronek
*Attorney, Agent, or Firm*—James R. Hoatson, Jr.; Thomas K. McBride; William H. Page, II

[57] ABSTRACT

An apparatus for the controlled oxidation of coke from a spent catalyst and the essentially complete conversion of carbon monoxide resulting from the oxidation of coke to produce regenerated catalyst and spent regeneration gas.

The apparatus comprises in combination a spentcatalyst receiving chamber for containing a dense bed of fluidized catalyst in which chamber spent-catalyst is oxidized to produce regenerated catalyst and partially spent regeneration gas; a transfer conduit through which said gas and said catalyst pass and in which carbon monoxide is essentially completely converted to carbon dioxide to produce spent regeneration gas and regenerated catalyst at an increased temperature; a regenerated-catalyst receiving chamber for containing a dense bed of regenerated catalyst and in which spent regeneration gas and regenerated catalyst are separated; and, an internal regenerated-catalyst recycle means in communication with both beds by which hot regenerated catalyst can be recycled within the apparatus from the dense bed of regenerated catalyst in the regenerated-catalyst receiving chamber to the dense bed of catalyst in the spent-catalyst receiving chamber in amounts to control the temperature and hence the rate of coke oxidation in the spent-catalyst receiving chamber.

In the apparatus of my invention, residual coke on regenerated catalyst can therefore be significantly reduced or controlled to low levels as desired. The CO burning rate in the transfer conduit is also increased because of the higher inlet temperature and the CO concentration in the spent regeneration gas leaving the apparatus is therefore reduced.

A particularly unique feature of the apparatus is the internal regenerated-catalyst recycle means which requires no expansion joints nor movable flow control means and which can be installed without cutting into either chamber of the apparatus.

5 Claims, 2 Drawing Figures

REGENERATION APPARATUS WITH INTERNAL REGENERATED-CATALYST RECYCLE MEANS

BACKGROUND OF THE INVENTION

1. Field of the Invention

The field of art to which this invention pertains is catalyst regeneration apparatus. More specifically, the present invention relates to a regeneration apparatus which is applicable for use in regenerating fluidizable catalytic cracking catalyst which has become spent by deposition of coke thereon.

2. Description of the Prior Art

In most regeneration processes presently employed, the oxidation of coke from spent catalyst is done in a single-chamber regeneration apparatus containing one or more dense beds located in the bottom of the apparatus with a large dilute-phase disengaging space positioned above and in connection with the dense bed. In this type of regeneration process, the dense bed is maintained in the bottom portion of the apparatus by limiting the superficial velocity of the incoming fresh regeneration gas to the transport velocity, that is, the velocity above which large amounts of catalyst would be carried out of the dense bed to the disengaging space. Typical velocities are therefore less than about 3 feet per second with 1.5 to 2.5 being the usual range. Provisions are made for recovering and returning to the dense bed any catalyst entrained in the flue gas effluent passing from the dense bed. This is generally carried out by passing this effluent flue gas containing entrained catalyst through separation means such as cyclone separation devices located in the disengaging space and returning separated catalyst to the same dense bed. Average residence time of the catalyst within the apparatus per pass through the apparatus is generally in the two to five minute range with 2 to 3 minutes being the more common, while the residence time of gas is generally within the range of 10 to 20 seconds. All of the regenerated catalyst is returned directly from the regeneration apparatus to the reaction zone without additional passes through any part of the regeneration apparatus.

It is also present practice to operate conventional regeneration apparatus in a manner to preclude the essentially complete combustion of the CO that is produced by coke oxidation. This is generally done by controlling the oxygen-containing gas stream introduced to such regeneration apparatus directly responsive to a rather small predetermined temperature differential between the flue gas outlet or the disengaging space and the dense bed of the regeneration apparatus. Excess oxygen within the regeneration apparatus is thus minimized thereby severly limiting CO afterburning to only that amount characterized by the small temperature differential.

Since the conversion of CO to $CO_2$ is quite exothermic, this restricting of CO afterburning is done for the very practical reason of avoiding the damaging effects of excessively high temperatures in the upper disengaging space region of the regeneration apparatus where there is little catalyst present to act as a heat sink. This practice, as exemplified by Pohlenz U.S. Pat. Nos. 3,161,583 and 3,206,391, produces a small amount of oxygen in the flue gas, generally in the range of about 0.1 to 1% oxygen, results in the flue gas containing from about 7 to about 14 vol.% CO and limits the temperatures achieved in the regeneration apparatus to a maximum of about 1275°F. Present industry practices to direct the flue gas containing CO to the atomsphere or to a CO boiler where it is used as fuel to make steam.

Controlling the amount of fresh regeneration gas to permit a slight amount of afterburning and the oncethrough flow of catalyst through the regeneration apparatus essentially fixes the degree of catalyst regeneration, that is, the amount of residual coke on regenerated catalyst. Although it is widely known that the residual coke content on regenerated catalyst has a great influence on the conversion and product distribution obtained in the reaction zone, residual coke level on regenerated catalyst produced by present regeneration processes conducted in conventional regeneration apparatus is not an independent variable but is fixed by regeneration apparatus design at a level typically from about 0.05 to about 0.4 wt.% carbon, and more often from about 0.15 to about 0.35 wt.% carbon.

The apparatus of my invention provides for essentially complete combustion within the apparatus of the CO produced and for recovery within the apparatus of at least a portion of the heat of combustion. This is distinguished from conventional regeneration apparatus which permit only small limited amounts of CO afterburning with essentially no recovery of the potential chemical heat within the apparatus. My invention recognizes the differences in the kinetics of coke oxidation and CO oxidation and provides separate regions within the regeneration apparatus for each to take place. Coke is oxidized primarily in a dense bed of fluidized catalyst in the spent-catalyst receiving chamber to produce regenerated catalyst and partially spent regeneration gas which are passed through a transfer conduit where essentially complete CO oxidation takes place and where heat of combustion is transferred to the regenerated catalyst passing through that zone. The resulting hot regenerated catalyst and spent regeneration gas are separated within a regenerated-catalyst receiving chamber and the regenerated catalyst is directed to a dense bed in the bottom portion of the regeneratedcatalyst receiving chamber.

An internal regenerated-catalyst recycle means in communication with both dense beds of catalyst is provided to return hot regenerated catalyst from the dense bed of catalyst in the regenerated-catalyst receiving chamber to the dense bed of catalyst in the spentcatalyst receiving chamber in amounts to control the temperature in the spent-catalyst receiving chamber and hence the rate of coke oxidation. The increased rate of reacton and catalyst residence time within the spent-ctalyst receiving chamber result in regenerated catalyst having lower levels of residual coke. Additionally, the rate of CO burning in the transfer conduit is also increased because of the higher inlet temperature and lower CO concentrations in the spent regeneration gas leaving the apparatus result. The remainder of the regenerated catalyst from the regenerated-catalyst receiving chamber is returned to the reaction zone at a higher temperature which permits reduced feed preheat requirements.

SUMMARY OF THE INVENTION

It is, accordingly, a broad objective of the present invention to provide a catalyst regeneration apparatus comprising a spent-catalyst receiving chamber, a transfer conduit, a regenerated-catalyst receiving chamber, and an internal regenerated-catalyst recycle means uniquely and advantageously arranged to offer features not found in present regeneration apparatus.

More specifically, it is an object of the present invention to present a catalyst regeneration apparatus in which CO can be essentially completely converted to $CO_2$ in a manner in which at least a portion of the heat of combustion can be recovered within the apparatus and in which the rate of coke oxidation can be controlled by the internal recycle of hot regenerated catalyst.

My invention can be briefly summarized as a catalyst regeneration apparatus comprising in combination: (a) a spent-catalyst receiving chamber for containing a dense-phase fluidized bed of catalyst said chamber having a spent-catalyst inlet means and a fresh-regeneration gas inlet means connected thereto to allow passage of spent catalyst and fresh regeneration gas respectively into said chamber and having a regenerated-catalyst/regeneration-gas outlet means connected thereto to allow passage of regenerated catalyst and regeneration gas from said chamber; (b) a transfer conduit, having an inlet at its lower end connected to said regenerated-catalyst/regeneration-gas outlet means, extending vertically upward through the lower portion of a hereinafter described regenerated-catalyst receiving chamber into said chamber and having an outlet near its upper end within said receiving chamber whereby regenerated catalyst and regeneration gas are carried from said spent-catalyst receiving chamber to said regenerated-catalyst receiving chamber; (c) a regenerated-catalyst receiving chamber for containing a dense-phase bed of catalyst having a regenerated-catalyst outlet means and a spent-regeneration-gas outlet means connected to said chamber to allow passage of regenerated catalyst and spent regeneration gas from said chamber; and, (d) an internal regenerated-catalyst recycle means having inlet means in communication with the dense-bed of regenerated catalyst in the regenerated-catalyst receiving chamber and having outlet means in communication with the dense-bed of catalyst in the spent-catalyst receiving chamber to allow passage of regenerated catalyst directly from the regenerated-catalyst receiving chamber to the spent-catalyst receiving chamber.

Other embodiments and objects of the present invention encompass further details such as the function and arrangement of these various elements all of which are hereinafter disclosed in the following discussion of each of these facets of the invention.

DESCRIPTION OF THE DRAWING

Figure 1:
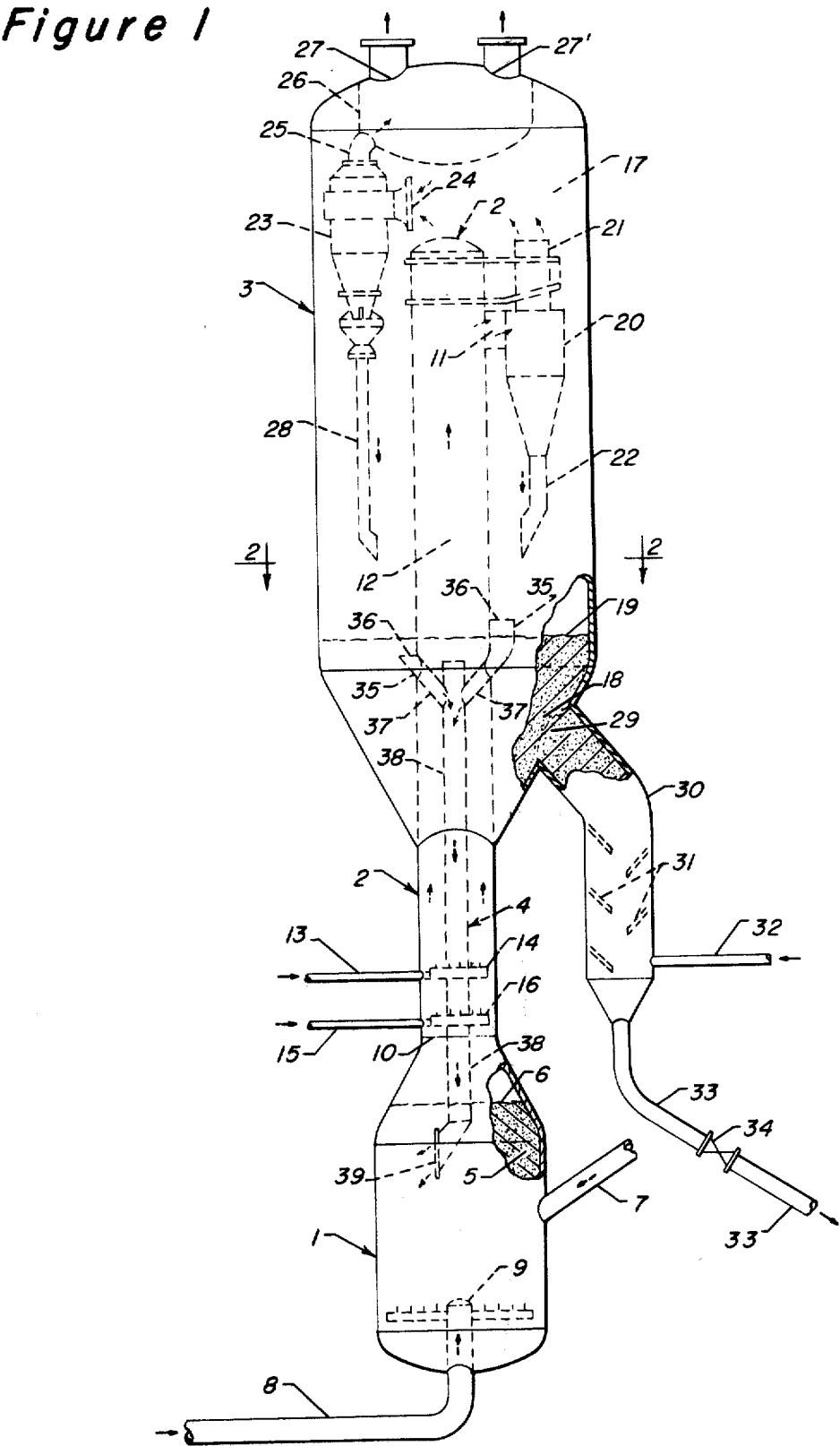
Figure 2:
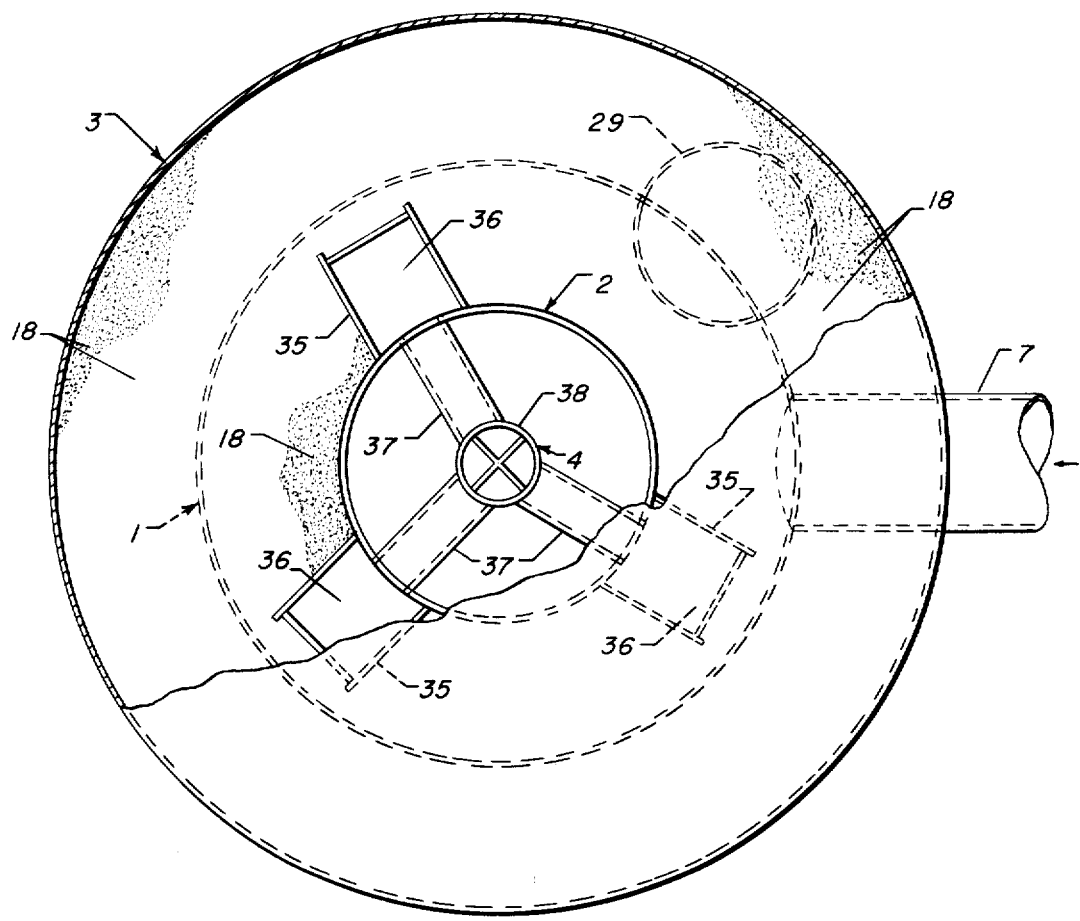

Having thus described the apparatus of my invention in brief general terms, reference is now made to the drawings depicting the preferred embodiment of my invention. FIG. 1 is a side view and FIG. 2 is a sectional plan view.

It will be understood that the drawings are only shown in such detail as is necessary for an understanding of the invention and that various items such as minor valves, bleed and dispersion steam lines, expansion joints, instrumentation and other control means have been omitted for the sake of simplicity.

Both drawings indicate that the apparatus of my invention basically comprises a spent-catalyst receiving chamber 1, a transfer conduit 2, a regenerated-catalyst receiving chamber 3, and an internal regenerated-catalyst recycle means 4.

The operation of the apparatus may be understood upon reference to FIG. 1. Shown in the lower portion of FIG. 1, spent-catalyst receiving chamber 1 has a dense-phase fluidized bed of catalyst 5, having a level or interface 6, maintained within the chamber. Attached to spent-catalyst receiving chamber 1 are shown spent-catalyst inlet means 7 and fresh-regeneration-gas inlet means 8. Spent catalyst from a reaction zone (not shown) is continuously introduced to the dense bed 5 via spent-catalyst inlet means 7. A controlled stream of fresh regeneration gas is continuously introduced via fresh-regeneration-gas inlet means 8 into bed 5 through distributing means 9 which allows the fresh regeneration gas to be more readily dispersed within the dense bed 5. Typically, the distributing means can be a metal plate containing holes or slots or preferably a pipe-grid arrangement, both types of which are familiar to those skilled in the art. Oxidation of the carbonaceous deposits on the spent catalyst takes place in dense bed 5 to produce partially spent regeneration gas and spent catalyst both of which pass out of chamber 1 through regenerated-catalyst/regeneration-gas outlet means 10, located at the top of chamber 1, and into transfer conduit 2 wherein CO oxidation takes place to produce spent regeneration gas and where the heat of combustion of the carbon monoxide to carbon dioxide is transferred to the catalyst being transported.

Transfer conduit 2 has an inlet 10 at its lower portion which is connected to the regenerated-catalyst/regeneration-gas outlet means of chamber 1. The inlet of conduit 2 is labeled 10 as is the regenerated-catalyst/regeneration-gas outlet means since they are in communication with each other. Transfer conduit 2 extends vertically upward through the lower portion of regenerated-catalyst receiving chamber 3. Conduit 2 has outlet means 11, which may comprise single or multiple openings, near its upper portion to allow catalyst and regeneration gas passing through volume 12 within conduit 2 to pass out of the conduit.

An external combustible fluid such as fuel gas or a liquid hydrocarbon stream may be admitted into the volume 12 within conduit 2 through combustible-fluid inlet means 13. The burning of such a fluid within volume 12 may be necessary to assist in initial process start-up, to increase the temperature within volume 12 sufficiently to initiate carbon monoxide oxidation, or to increase the temperature of the catalyst particles passing through the conduit beyond that which could be achieved by CO burning alone. Although not shown in FIG. 1, additional combustible fluid could be added to chamber 1 for some of or all of the above reasons. Optional distribution means 14 can be used to help distribute combustible fluid across the cross-sectional area of the transfer conduit 2.

Additionally, a second stream of fresh regeneration gas may be admitted into volume 12 through fresh-regeneration-gas inlet means 15. This fresh regeneration gas stream may be for the purpose of supplying needed oxygen to support burning of the external combustible fluid or to insure the essentially complete combustion of CO within transfer conduit 2. Optional distribution means 16 can be used to help distribute the fresh regeneration gas across the cross-sectional area of the transfer conduit 2.

Regenerated-catalyst receiving chamber 3 contains a dilute-phase disengaging space 17 and a dense bed of regenerated catalyst 18, having a level or interface located at 19, in the lower portion of the chamber. Transfer conduit 2 extends into disengaging space 17 and transfer conduit outlet means 11 is located above interface 19 of dense bed 18. Outlet means 11 will be directly connected to a separation means whereby catalyst and regeneration gas passing out of conduit 2 can be separated. Separation means which can be employed shall include: a disengaging space in which separation of regenerated catalyst and spent regeneration gas takes place by a sudden decrease in velocity of the mixture of catalyst and gas leaving outlet means 11; cyclone separation means arranged in parallel or series flow arrangements to achieve the desired degree of separation; or, combinations of a disengaging space and cyclone separation means. In the preferred embodiment indicated in the drawing, outlet means 11 will be directly connected to an inlet of a cyclone separation means. The inlet to cyclone separation means 20 is also indicated as 11 since the outlet of conduit 2 and the cyclone-separation-means inlet are in communication with each other. Regenerated catalyst and spent regeneration gas will therefore pass out of conduit 2 into cyclone separation means 20. Separated spent regeneration gas passes out of cyclone separation means 20 through outlet 21 into dilute-phase disengaging space 17 while separated regenerated catalyst passes out of separation means 20 through dipleg 22 directed downward toward dense bed 18.

As shown in the drawing, another cyclone separation means 23 is located in disengaging space 17 and has an inlet 24 which receives regeneration gas and any entrained catalyst located in disengaging space 17. Regeneration gas and any entrained catalyst are substantially separated from each other with the spent regeneration gas passing out of cyclone separation means 23 at outlet 25, and into plenum chamber 26 and then out of the apparatus via spent-regeneration-gas outlet means 27 and 27'. Catalyst separated from the regeneration gas is passed via dipleg 28 downward toward dense bed 18.

Regenerated catalyst in dense bed 18 moves in a downward direction and passes out of dense bed 18 through both outlet means 29 and through internal regenerated-catalyst recycle means 4.

Catalyst passing through outlet means 29 can be returned directly via a conduit to the reaction zone where the catalyst will again become contaminated with coke. As indicated in FIG. 1, a regenerated-catalyst stripper 30 may optionally be connected to chamber 3 to allow stripping of interstitial and adsorbed regeneration gas from the regenerated catalyst prior to its being returned to the reaction zone. Since the chamber 3 outlet means and the inlet of the stripper 30 are in communication with each other, they are both labeled in the drawing as 29. Regenerated catalyst will pass downward over baffles 31 and will be countercurrently stripped by a stripping medium which enters stripper 29 through inlet means 32. Generally, the stripping medium will be steam. Stripped regenerated catalyst will then leave stripper 29 and pass to the reaction zone via conduit 33. Control means 34 may be located on conduit 33 to control the rate of withdrawal of stripped regenerated catalyst. Typically, control means 34 will be a slide valve which is operated by a reaction zone temperature or level controller.

Internal regenerated-catalyst recycle means 4 is in communication with dense bed 18 in regenerated-catalyst receiving chamber 3 at its upper end and with dense bed 5 in spent-catalyst receiving chamber 1 at its lower end to allow regenerated catalyst to be recycled directly from dense bed 18 to dense bed 5.

In the preferred embodiment illustrated, internal regenerated-catalyst recycle means 4 will comprise hoppers 35 having inlet means 36, conduits 37, and dipleg 38. Hoppers 35 will be located in regenerated-catalyst receiving chamber 3 and will be connected by conduits 37 to dipleg 38 which extends downward into dense bed 5. A flapper valve 39 will preferably be located at the outlet of dipleg 38 to ensure unidirectional flow of solids or gas in dipleg 38. Hoppers 35 will be positioned in chamber 3 so that the inlet means 36 are at different elevations. With this arrangement, the amount of regenerated catalyst recycled from dense bed 18 to dense bed 5 can be controlled by raising or lowering the interface 19 of dense bed 18 to cover or uncover one or more hopper inlet means thereby letting more or less regenerated catalyst flow into the hoppers.

FIG. 2 more clearly illustrates the components of the preferred embodiment of the internal regenerated-catalyst recycle means 4. Three collecting hoppers 35 having inlet means 36 are shown attached by conduits 37 to dipleg 38. Regenerated catalyst flows into inlet means 36 of hopper 35 and then through conduit 37 to dipleg 38 located within transfer conduit 2 which directs the flow of catalyst downward to dense bed 5 (not indicated in FIG. 2) in spent-catalyst receiving chamber 1.

FIG. 2 also indicates the positioning of hoppers 35 and conduits 37 for structural support and with respect to regenerated-catalyst outlet means 29 so that the flow of regenerated catalyst through outlet means 29 is not restricted.

DESCRIPTION OF THE INVENTION

At the outset, the definitions of various terms will be useful in making clear the operation, objects and advantages of the apparatus of my invention as herein described.

The term "spent catalyst" as used in the claims and specification shall mean catalyst withdrawn from a reaction zone because of reduced activity caused by coke deposits. Spent catalyst can obtain anywhere from a few tenths up to about 5 wt.% coke but typically in FCC operations, spent catalyst will contain from about 0.5 to about 1.5 wt.% coke.

The term "regenerated catalyst" as used herein shall mean catalyst from which the majority of coke has been removed by oxidation in a regeneration apparatus. Regenerated catalyst produced by the apparatus of my invention will typically contain from about 0.01 to about 0.2 wt.% coke and more specifically from about 0.01 to about 0.1 wt.% coke.

The term "regeneration gas" shall mean, in a generic sense, any gas which is to contact catalyst or which has contacted catalyst within the regeneration apparatus. Specifically the term "fresh regeneration gas" shall include oxygen-containing gases such as air or oxygen-enriched or deficient air which pass into the regeneration apparatus to allow oxidation of coke on the spent catalyst. "Partially spent regeneration gas" shall refer to regeneration gas which has contacted catalyst within the spent-catalyst receiving chamber (hereinafter described) and which contains a reduced quantity of free oxygen as compared to fresh regeneration gas. Typically, the partially spent regeneration gas contains water, nitrogen, oxygen, carbon monoxide, and carbon dioxide.

The term "essentially complete combustion of CO" as used herein shall mean that the CO content of the regeneration gas leaving the regeneration apparatus has been reduced to and maintained at a concentration of less than about 2000 ppm. and generally less than about 500 ppm.

"Spent regeneration gas" therefore shall mean regeneration gas leaving the regeneration apparatus which contains less than about 2000 ppm. carbon monoxide, carbon dioxide, nitrogen, water and from about a few tenths up to as much as 15 mole % free oxygen. Generally, spent regeneration gas will contain less than about 500 ppm. CO.

The basic components of the regeneration apparatus of my invention hereinafter described in more detail, are briefly defined as follows. The term "spent-catalyst receiving chamber" shall mean a chamber for containing a dense-phase fluidized bed of catalyst wherein the majority of coke is oxidized. The term "transfer conduit" as used herein shall mean a conduit in which essentially complete CO conversion takes place in the presence of dilute-phase fluidized catalyst to produce spent regeneration gas. The term "regenerated-catalyst receiving chamber" shall mean a chamber for separating regenerated catalyst and spent regeneration gas and for containing a dense-phase bed of regenerated catalyst. "Internal regenerated-catalyst recycle means" shall mean that portion of the regeneration apparatus wholly within the apparatus by which a portion of regenerated catalyst is recycled directly from the dense bed of regenerated catalyst within the regenerated-catalyst receiving chamber to the dense bed of catalyst within the spent-catalyst receiving chamber.

In regeneration apparatus now most frequently used in fluid catalytic cracking processes, CO, resulting from the oxidation of coke, is not essentially completely oxidized to $CO_2$. Spent catalyst is introduced into the regeneration apparatus wherein catalyst is maintained in a dense bed for average catalyst residence times of 2 minutes or more by limiting the superficial velocity of the incoming fresh regeneration gas. Coke is oxidized to produce regenerated catalyst and partially spent regeneration gas which are directed out of the regeneration apparatus. Regenerated catalyst produced by present processes is neither stripped of adsorbed and interstitial regeneration gas nor recycled for any purpose within the regeneration apparatus.

More specifically, in present-used regeneration apparatus, the amount of fresh regeneration gas admitted to the apparatus is typically controlled by a predetermined temperature differential between the gas outlet section of the regeneration apparatus and either the dense bed temperature or a dilute phase temperature within the apparatus. Such control scheme minimizes excess oxygen and allows only a small amount of afterburning, that is, only that amount characterized by the temperature differential to take place; indeed, its purpose is to prevent significant CO combustion. Since there is essentially no combustion of CO, temperatures within the regeneration apparatus will generally not be higher than about 1275°F. with the usual range being from about 1150° to about 1250°F.

When such a control scheme is used, the amount of residual coke left on regenerated catalyst is largely a function of regeneration apparatus design, that is, how well gas and solids are mixed, the number of stages used, the residence time and the resulting temperature. Typically, regenerated catalyst will contain less than about 0.5 wt.% coke and usually from about 0.15 to about 0.35 wt.% coke while spent catalyst entering the regeneration apparatus generally contains from about 0.5 to 1.5 wt.% coke.

Partially spent regeneration gas is separated from entrained regenerated catalyst by cyclone separation means located within the regeneration apparatus and separated gas containing CO is passed from the regeneration apparatus either directly to the atmosphere or to a carbon monoxide boiler where the chemical heat of carbon monoxide is recovered externally to the regeneration apparatus by combustion as a fuel for the production of steam. Separated regenerated catalyst is returned to the bottom portion of the regeneration apparatus and regenerated catalyst then leaves the apparatus, with no prior stripping of regeneration gas, and contacts the feed stock in a reaction zone.

In a typical regeneration apparatus, the spent catalyst is maintained in the bottom portion of the apparatus in one or more dense beds by limiting the superficial velocity of the incoming fresh regeneration gas. The superficial velocity is limited to the transport velocity, that is, the velocity above which large amounts of catalyst would be carried out of the dense bed to the cyclones. Typical velocities are therefore less than about 3 feet per second with about 1.5 to about 2.5 being the usual range.

It is this limit on superficial velocity which produces the rather large catalyst inventories found in conventional regeneration apparatus. The determination of the inventory in a typical regeneration apparatus is based upon the feed rate to the FCC process (or more specifically to the coke yield from that feed rate) and the superficial velocity in the regeneration apparatus. This coke yield anticipated from a desired feed rate determines the rate of the fresh regeneration gas to the regeneration apparatus. This gas rate at a limiting superficial velocity then determines the cross-sectional area of the regeneration apparatus. With a known catalyst density and height of the dense bed, the inventory of the regeneration apparatus, and for practical purposes for the FCC process, is fixed. Catalyst residence times which result are generally from about 2 to 5 minutes with about 2 to 3 being the general range.

Since catalyst makeup rates required to make up losses and maintain catalyst activity tend to be a percentage of the total catalyst inventory, these rates for FCC processes with conventional regenerators are rather high.

Thus, the typical regeneration appartus as presently designed and operated has these disadvantages: no provision is made for the essentially complete conversion of CO to $CO_2$ within the apparatus and a CO disposal problem thus arises; with CO conversion essentially precluded, the coke oxidation temperature cannot be increased without burning external torch oil within the apparatus; the regenerated catalyst produced still contains significant amounts of residual coke; and, catalyst inventories tend to be rather large.

In the apparatus of my invention, coke from spent catalyst is efficiently oxidized to produce regenerated catalyst having very low residual coke levels and CO produced is essentially completely converted to $CO_2$ with at least a portion of the heat of combustion being recovered within the apparatus. More specifically, efficient oxidation is achieved by employing superficial velocities higher than the critical velocity and by recycling a portion of hot regenerated catalyst from the regenerated-catalyst receiving chamber back to the spent-catalyst receiving chamber where the majority of coke oxidation occurs.

Very broadly, my apparatus comprises a spent-catalyst receiving chamber, a transfer conduit, a regenerated-catalyst receiving chamber and an internal regenerated-catalyst recycle means.

Spent catalyst and regeneration gas are passed through their respective inlet means into a spent-catalyst-receiving chamber containing a dense bed of fluidized catalyst and coke is oxidized to produce regenerated catalyst and partially spent regeneration gas. Regeneration gas and regenerated catalyst are transported from the spent-catalyst receiving chamber through a regenerated-catalyst/regeneration-gas outlet means into a transfer conduit where essentially complete CO oxidation takes place and where at least a portion of the heat of combustion of the CO is transferred to the catalyst. Catalyst residence time in the transfer conduit is sufficiently short to preclude further substantial oxidation of the residual coke and additional production of CO. Catalyst and spent regeneration gas leave the transfer conduit and are separated by separation means located within the regenerated-catalyst receiving chamber. Separated regenerated catalyst passes to a dense bed of catalyst in the bottom portion of the regenerated-catlyst receiving chamber and spent regeneration gas passes out of the chamber and out of the regeneration apparatus through spent-regeneration-gas outlet means. A portion of the hot regenerated catalyst is then recycled via an internal regenerated-catalyst recycle means from the dense bed of hot catalyst in the regenerated-catalyst receiving chamber to the dense bed of catalyst in the spent-catalyst-receiving chamber to increase the temperature within the latter chamber thereby increasing the rate of coke oxidation and indirectly increasing the rate of CO oxidation in the transfer conduit. The remainder of the regenerated catalyst is returned from the regenerated-catalyst receiving chamber to the reaction zone through a regenerated-catalyst outlet means.

Regenerated catalyst maay be optionally stripped of adsorbed and interstitial regeneration gas in a regenerated catalyst stripper.

It is well known in the art that the level of residual coke on the regenerated catalyst has a great influence on the conversion and product yield distribution obtained in the reaction zone, especially when coke-sensitive zeolite-containing catalysts are employed in the short contact time, dilute-phase reaction zones. The apparatus of my invention makes it possible not only to produce regenerated catalyst having lower residual coke and therefore higher activity but also to eliminate the problem of CO pollution without requiring a CO boiler and to recover within the apparatus at least a portion of the heat of CO combustion for advantageous uses within the apparatus and the FCC process.

The recycle of hot regenerated catalyst back to the spent-catalyst-receiving chamber increases the rate of coke oxidation and CO conversion making smaller equipment possible. The return of hotter than usual regenerated catalyst to the reaction zone allows possible reduction in feed preheat requirements.

Dramatic catalyst inventory reductions are possible by the apparatus of my invention. As previously described, inventories in regeneration apparatus are directly related to superficial velocities employed within the regeneration apparatus. Since it is not intended in the apparatus of my invention that catalyst in the spent-catalyst receiving chamber remain in that chamber, the superficial velocity of the fresh regeneration gas into the chamber is not limited to the critical velocity. Superficial velocities in the spent catalyst receiving chamber will be in the range of about 3 to 10 feet per second so that catalyst can be carried from the chamber into the transfer conduit. With superficial velocities now 2 to 3 times the critical velocity, catalyst inventories using the apparatus of this invention will be about 40 to 60 percent of those in present regeneration apparatus. As an example, moderately sized FCC process of the type presently in industry use will contain about 150 tons of catalyst. By using the regeneration apparatus of this invention in an FCC process of the same size, a refiner could save the initial investment represented by at least 75 tons of catalyst.

Catalyst makeup rates required to make up losses and maintain activity will also be reduced with my apparatus since such rates tend to be a percentage of the total catalyst inventory.

Because of higher temperatures which result from the recycle of hot regenerated catalyst, better gas-solid contact due to the higher velocities now permitted, and higher oxygen partial pressures, the rate of coke combustion in the apparatus of my invention will be increased and oncethrough catalyst residence times can be reduced from the present 2 to 5 minutes to less than 2 minutes while regeneration gas residence times can be reduced from about 20 seconds to less than 10 seconds.

Besides permitting smaller equipment size, another important result of shorter catalyst residence time is that it may allow the steam stripping of flue gas components from the regenerated catalyst. In spite of the fact that flue gas components are entrained by regenerated catalyst into the reaction zone and hence become part of a product stream, steam stripping of regenerated catalyst has generally not been practiced because of the longer catalyst residence times in conventional regeneration apparatus and because the entire catalyst inventory is generally maintained in a single dense bed within the apparatus. Exposure of this quantity of catalyst to steam for the longer period of time would increase the catalyst deactivation rate.

Thus, the apparatus of my invention overcomes the disadvantages of the prior art regeneration apparatus. With the apparatus of my invention; provision is made for the essentially complete conversion of CO to $CO_2$ within the apparatus thus eliminating a CO disposal problem without the need for a CO boiler; coke oxidation temperatures can be increased without burning external torch oil within the apparatus or employing a fresh regeneration gas preheater; the regenerated catalyst produced contains very low amounts of residual coke; and catalyst inventories and equipment size can be reduced.

Spent catalyst inlet means and fresh-regeneration-gas inlet means are connected to the spent-catalyst receiving chamber to carry the spent catalyst from the reaction zone and fresh regeneration gas into the chamber. Generally, these inlet means are conduits which typically may contain distribution devices located on the outlets within the chamber to allow distribution of spent catalyst and fresh regeneration gas within the dense bed of catalyst contained within the chamber in order to promote efficient oxidation of coke from the catalyst. Preferably, the fresh regeneration gas inlet is connected to or passes through a grid located in the lower portion of the chamber to allow distribution of fresh regeneration gas within the dense bed. A regenerated-catalyst/regeneration-gas outlet means is located at the upper portion of the chamber and specifically at the top of the chamber to allow passage of regenerated catalyst and regeneration gas in admixture from the chamber.

The regenerated-catalyst/regeneration-gas outlet means is connected to the inlet of the transfer conduit which is a long cylindrical vessel through which regenerated catalyst and regeneration gas pass in admixture and in which CO is essentially completely converted to $CO_2$ to produce spent regeneration gas with at least part of the heat of combustion being transferred to the regenerated catalyst. The cross-sectional area of the transfer conduit will be much smaller than that of the spent-catalyst receiving chamber so that superficial gas velocities within the conduit will be within the range of from about 10 to about 25 feet per second. The transfer condiut may optionally have connected to it combustible-fluid inlet means and fresh-regeneration-gas inlet means to carry external combustible fluid and fresh regeneration gas into the transfer conduit for reasons previously discussed. Typically, these inlet means will be conduits which may contain distribution devices located on their outlets within the transfer conduit to allow distribution of the combustible fluid and fresh regeneration gas within the conduit.

The transfer conduit extends vertically upward through the lower portion of a regenerated-catalyst receiving chamber and has an outlet near its upper end which is within the regenerated-catalyst-receiving chamber to permit passage of the regenerated catalyst and spent regeneration gas from the transfer conduit into the chamber. The outlet of the transfer conduit will be connected to a separation means provided to separate regenerated catalyst and spent regeneration gas passing from the transfer conduit. Such separation means may comprise: a disengaging chamber in which separation is effected by a sudden decrease in superficial velocity of the gas-catalyst mixture exiting the transfer conduit into the chamber; one or more cyclone separation means comprising parallel or series flow arrangements of cyclone separation devices to effect the desired degree of separation; or combinations of a disengaging space and cyclone separation means. More preferably and sepcifically, the outlet of the transfer conduit is directly connected to an inlet to such a cyclone separation means for quick, positive and efficient separation.

Separated regenerated catalyst is directed downward toward a dense bed of regenerated catalyst located in the lower portion of the regenerated-catalyst receiving chamber. Regenerated-catalyst outlet means and spent-regeneration-gas outlet means are connected to this chamber at the lower and upper portions respectively to carry regenerated catalyst from the chamber to the reaction zone and spent regeneration gas from the chamber respectively. Typically, these means are conduits which may have control means such as slide valves located thereon to control the flow of catalyst or gas.

The regenerated-catalyst receiving chamber may optionally have attached to it, at the lower portion thereof, a regenerated-catalyst stripper to strip regenerated catalyst of adsorbed and interstitial regeneration gas prior to return of the catalyst from the chamber to the reaction zone. Such a stripper would typically contain baffles over which regenerated catalyst from the dense bed would flow in a downward direction against an upward flow of stripping medium which would generally be steam. When such a stripper is employed, the regenerated-catalyst-outlet means would be located at the lower portion or outlet of the stripper to permit the flow of stripped regeneration catalyst from the stripper to the reaction zone.

The internal regenerated catalyst recycle means has been previously defined and described in terms of a preferred embodiment. The advantages of the internal regenerated-catalyst recycle means which is incorporated as a feature of my apparatus are that it requires no expansion joints nor movable flow control means such as valves and that it can be installed without cutting into either chamber of the apparatus.

In the startup and shutdown of regeneration apparatus, portions of the apparatus expand and contract at different rates. If a catalyst recycle means were rigidly attached to two different portions of the apparatus, as for instance to the two chambers of the apparatus of my invention, an expansion joint would be required for the catalyst recycle means to accommodate the different rates of expansion and contraction. The internal regenerated-catalyst recycle means included as an element of the apparatus of my invention is attached to only one other element or portion of the apparatus. In my apparatus, the internal regenerated-recycle means is rigidly attached only to the transfer conduit and is free to move as the transfer conduit itself expands or contracts.

By positioning the collecting hoppers of the preferred embodiment of this internal regenerated-catalyst recycle means with their inlet means at different elevations so that they can be covered or uncovered by raising or lowering the catalyst level in the regenerated-catalyst receiving chamber, a movable control means to control the flowrate of recycled regenerated catalyst can also be eliminated. A control means having moving parts, such as a control valve, would present the possibility of maintenance problems requiring a shutdown of the entire regeneration apparatus. The preferred embodiment of the internal regenerated-catalyst recycle means avoids the possibility since there are no moving parts.

Additionally, the internal regenerated catalyst recycle means can be installed in the regeneration apparatus without cutting into the chambers of the apparatus and then stress relieving those areas of the chambers. The internal catalyst recycle means is not attached to either chamber and thus initial chamber fabrication is simplified and any subsequent chamber modification is eliminated.

It will be understood that it is not intended to limit the internal-regenerated catalyst recycle means to the preferred embodiment hereinbefore described. On the contrary, it is intended to cover other alternatives, modifications or equivalents obvious to those skilled in the art offering substantially the advantages described above and included within the spirit and scope of the invention.

The design of the regeneration apparatus disclosed is such that the spent-catalyst receiving chamber is located at the lower portion of the apparatus, while the regenerated-catalyst receiving chamber is placed at the uppermost portion of the apparatus. With this arrangement, regenerated catalyst can be maintained in the regenerated-catalyst receiving chamber at sufficient head to allow flow of regenerated catalyst both back to the spent-catalyst receiving chamber and to the reaction zone. The transfer conduit is vertically positioned and connects the two chambers. The lower portion of the conduit is wholly between the two chambers and the upper portion extends into and is contained within the regenerated-catalyst receiving chamber.

In a preferred design, the spent-catalyst receiving chamber, transfer conduit, and regenerated-catalyst receiving chamber will all be cylindrical and preferably the two chambers and the transfer conduit will be arranged in the manner described above on a common vertical centerline.

Materials of construction for building the apparatus of my invention shall be materials which are able to withstand the attrition conditions inherent in the fluidized-catalyst apparatus and which are able to withstand the high temperatures involved. Specifically, metals such as carbon steel and stainless steel which may or may not be lined with abrasion-resistant refractory linings are contemplated. The spent-catalyst receiving chamber should be so designed and constructed to withstand constant temperatures up to about 1400°F. and temperatures up to about 1500°F. or higher for reasonably short periods of time. The transfer conduit and regenerated catalyst receiving chamber should be designed to be able to withstand sustained operation of 1400°F. but should also be capable of withstanding shorter-term temperatures as high as 1550° to 1600°F. The entire apparatus should also be designed for normal operating pressures of from about atmospheric up to about 50 psig.

I claim as my invention:

1. An apparatus of oxidizing coke on spent catalyst which comprises in combination:

a. a spent-catalyst receiving chamber for containing a dense-phase fluidized bed of catalyst, and chamber having upper and lower sections, a fresh-regeneration-gas inlet means connected to said chamber at said lower section to allow passage of fresh regeneration gas into said chamber through said lower section, a spent-catalyst inlet means connected to said chamber to allow passage of spent catalyst into said chamber, and a regenerated-catalyst/regeneration-gas outlet means at the upper section of said chamber to allow passage of regenerated catalyst and regeneration gas in admixture from said chamber;

b. a transfer conduit having an inlet at its lower end connected to said regenerated-catalyst/regeneration-gas outlet means, extending vertically upward through the lower portion of a hereinafter described regenerated-catalyst receiving chamber into said chamber, and having an outlet means near its upper portion located within said chamber and connected to a separation means whereby regenerated catalyst and regeneration gas are carried in admixture from said spent-catalyst receiving chamber to said separation means;

c. a regenerated-catalyst receiving chamber for containing a dense-phase bed of catalyst and said separation means said chamber positioned entirely above said spent-catalyst receiving chamber and having upper and lower sections, a spent regeneration gas outlet means connected to said chamber at its upper section to allow passage of spent regeneration gas from said chamber, and having a regenerated catalyst stripper connected to said chamber at its lower section and stripper having connected to its outlet a regenerated-catalyst outlet means to allow passage of regenerated catalyst from said stripper; and, d. an internal regenerated-catalyst recycle means comprising: collecting hoppers having inlet means at different elevations at least one of which is in communication with the dense-bed of regenerated catalyst in the regenerated-catalyst receiving chamber; a dipleg having an outlet means in communication with the dense bed of catalyst in the spent-catalyst receiving chamber; and, conduits connecting said hoppers to said dipleg said recycle means to allow passage of regenerated catalyst directly from the regenerated-catalyst receiving chamber to the spent-catalyst receiving chamber.

2. The apparatus of claim 1 further characterized in that said spent-catalyst receiving chamber, a transfer conduit, regenerated-catalyst receiving chamber and internal regenerated-catalyst recycle means are positioned on a common vertical centerline.

3. The apparatus of claim 1 further characterized in that said outlet of said transfer conduit is connected to an inlet of a cyclone separation means.

4. The apparatus of claim 1 further characterized in that said transfer conduit has connected thereto a combustible fluid inlet means to allow passage of combustible fluid into said conduit.

5. The apparatus of claim 1 further characterized in that said transfer conduit has connected thereto a fresh regeneration gas inlet means to allow passage of fresh regeneration gas into said conduit.

* * * * *